Figure 1:
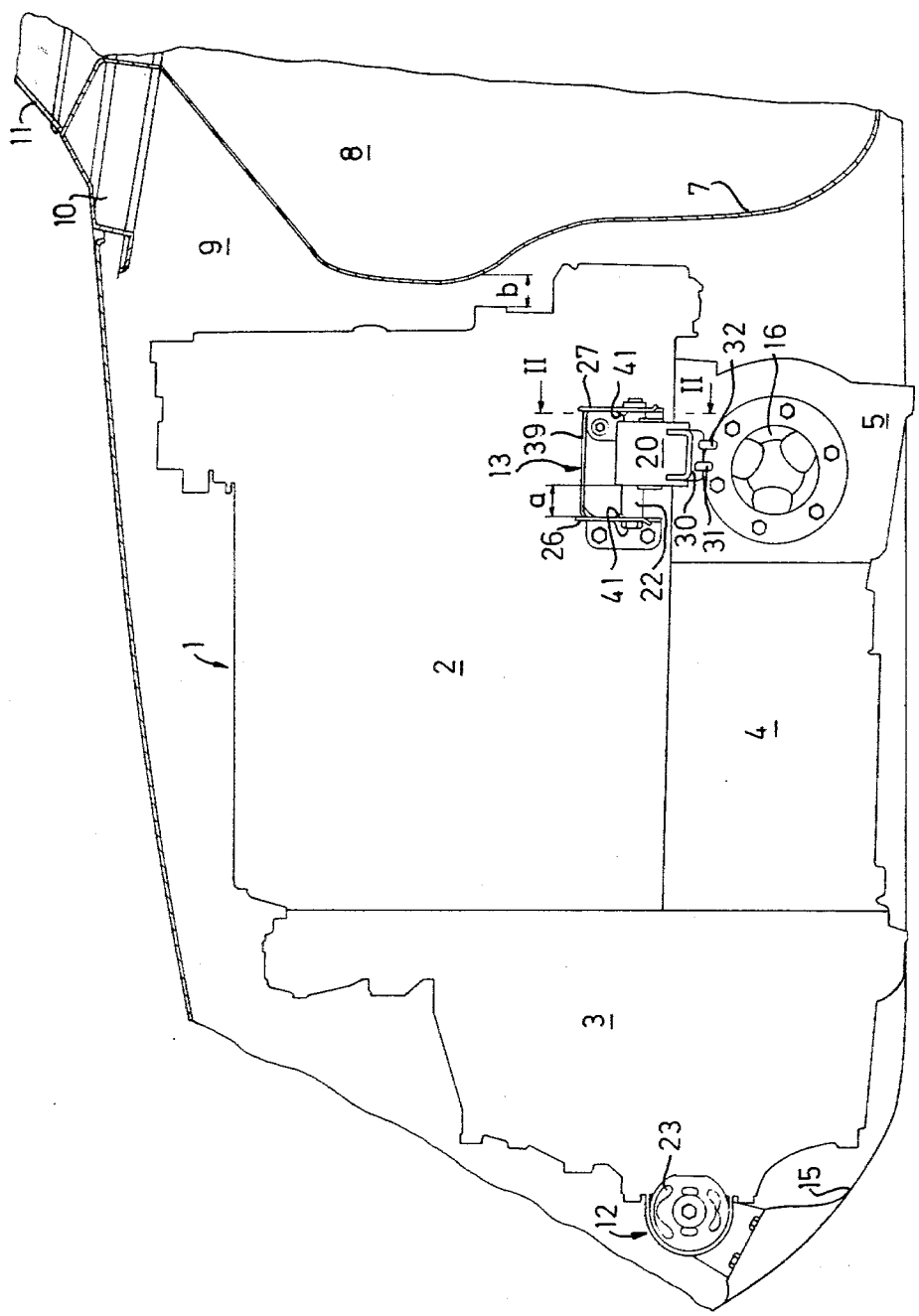

United States Patent [19]

Nilsson et al.

[11] 4,266,630

[45] May 12, 1981

[54] POWER UNIT SUSPENSION IN MOTOR VEHICLES

[75] Inventors: Dan L. Nilsson, Sjuntorp; Joel L. Danielsson, Trollhättan, both of Sweden

[73] Assignee: Saab-Scania Aktiebolag, Sodertalje, Sweden

[21] Appl. No.: 26,796

[22] Filed: Apr. 3, 1979

[30] Foreign Application Priority Data

Apr. 11, 1978 [SE] Sweden .................. 7804032

[51] Int. Cl.³ .............................. B60K 5/00
[52] U.S. Cl. ...................... 180/291; 248/544; 248/569; 248/632
[58] Field of Search ........... 180/291, 282, 232, 299, 180/300; 248/548, 544, 562, 569, 568, 632

[56] References Cited

U.S. PATENT DOCUMENTS

| 2,066,530 | 1/1937 | Hoffman | 180/300 X |
|---|---|---|---|
| 3,702,178 | 11/1972 | Schulz | 180/291 X |
| 3,718,304 | 2/1973 | Schulz et al. | 248/548 |
| 3,851,722 | 12/1974 | Grosseau | 180/232 |
| 4,142,701 | 3/1979 | Fujii et al. | 248/544 |

FOREIGN PATENT DOCUMENTS

| 2152136 | 4/1973 | Fed. Rep. of Germany . | |
| 2249555 | 4/1974 | Fed. Rep. of Germany . | |
| 2255963 | 5/1974 | Fed. Rep. of Germany | 180/232 |
| 2506303 | 8/1976 | Fed. Rep. of Germany | 180/232 |

*Primary Examiner*—David M. Mitchell
*Assistant Examiner*—D. W. Underwood
*Attorney, Agent, or Firm*—Cushman, Darby & Cushman

[57] ABSTRACT

In a forward engine compartment of a vehicle a power unit is suspended so as to have a controlled rearward movement in the engine compartment when exposed to excessive forces in the lengthwise direction of the vehicle during a collision. There is at least one rear mounting having a resilient body separating two members secured to the power unit and to structural portions of the vehicle body, respectively. Said rear mounting allows one of the members a limited movement relative to the other while absorbing deformation work. As the power unit travels further back the attachment of the rear mounting is gradually destroyed, but it holds long enough to allow the power unit to hit a cowl panel at the rear of the engine compartment, thus controlling the travel of the power unit.

12 Claims, 4 Drawing Figures

POWER UNIT SUSPENSION IN MOTOR VEHICLES

The present invention relates to an arrangement for suspending a power unit in a forward engine compartment of a vehicle, for controlling during a collision the rearward movement of the power unit in the engine compartment caused by excessive forces in the lengthwise direction of the vehicle, comprising a plurality of resilient mountings connecting the power unit to structural portions of the vehicle body and/or to a frame attached to the vehicle body, there being provided at least one resilient rear mounting having a resilient body separating two members, one of which is attached to the power unit while the other is attached to structural portions of the vehicle body.

Known arrangements of the kind just mentioned are made and dimensioned to give sound and vibration insulation and to resist forces occuring during operation. It is also known to provide the mountings incorporated in the arrangement with limit stops which in a collision are capable of restraining the power unit within narrow limits for forces up to a certain level.

In certain countries, e.g. the U.S.A., there is legislation concerning the collision safety of vehicles. In said legislation it is prescribed, inter alia, that a car windshield shall not be destroyed in a barrier collision with the car travelling at a certain speed. In practice, this requirement means that the power unit must be given a controlled displacement backwards towards the passenger compartment during a collision, thereby passing under a windshield beam supporting the windshield without deforming this beam. In compact cars with the windshield beam drawn well forward, the heightwise distance between the power unit and the windshield beam can be very small and the shift in height which can be permitted in a collision becomes very small to a corresponding degree.

The arrangement according to the present invention is intended to provide a controlled displacement of the power unit during a head-on collision.

The invention is basically characterized by the combination that said rear mounting allows one of its members a limited rearward movement, in a direction generally opposite to the normal direction of travel of the vehicle, relative to the other member, while absorbing deformation work in the rear mounting, said rearward movement being limited by fixed means, and that the attachment to the power unit or the structural portions of the body of the rear mounting is formed to allow a controlled outer deformation on the application of a force exceeding a predetermined level, so that the power unit can be given a total displacement in the engine compartment to the point of contact with a cowl panel at the rear of the engine compartment before the connection formed between the power unit and the structural portions of the body by means of the rear mounting is destroyed.

The invention is further distinguished in that the displacing movement of the metal members relative each other, limited by fixed means, corresponds to a distance substantially equal to a free distance between the cowl panel and power unit in normal conditions.

As a result of the inventive solution, means for controlling the displacement of the power unit during the course of a collision are enabled to be formed in integration with at least one rear resilient mounting. The solution provides for movement of the power unit towards the cowl panel behind it occurring under controlled conditions right up to the point where the unit thrusts into the panel. During subsequent deformation, the cowl panel guides the continued movement of the power unit.

Other features distinguishing the invention are apparent from the following description and accompanying drawings.

Figure 3:
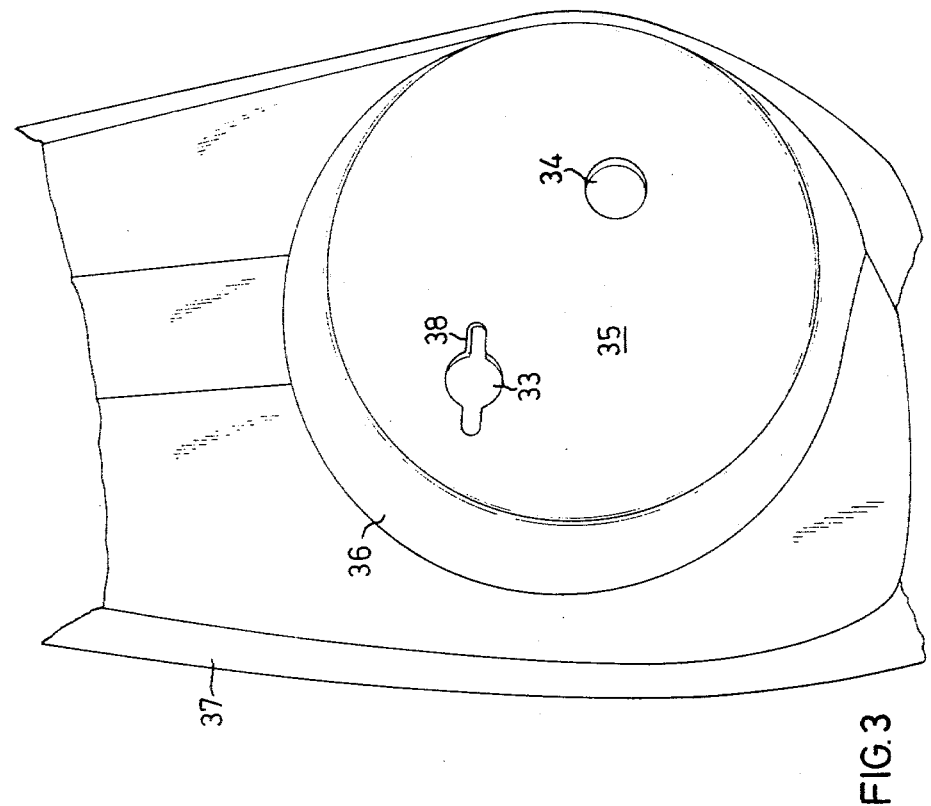
Figure 2:
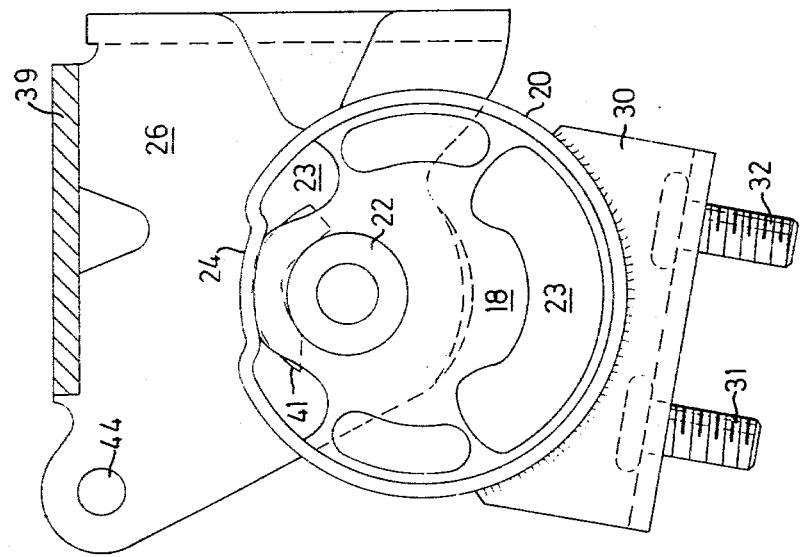
Figure 4:
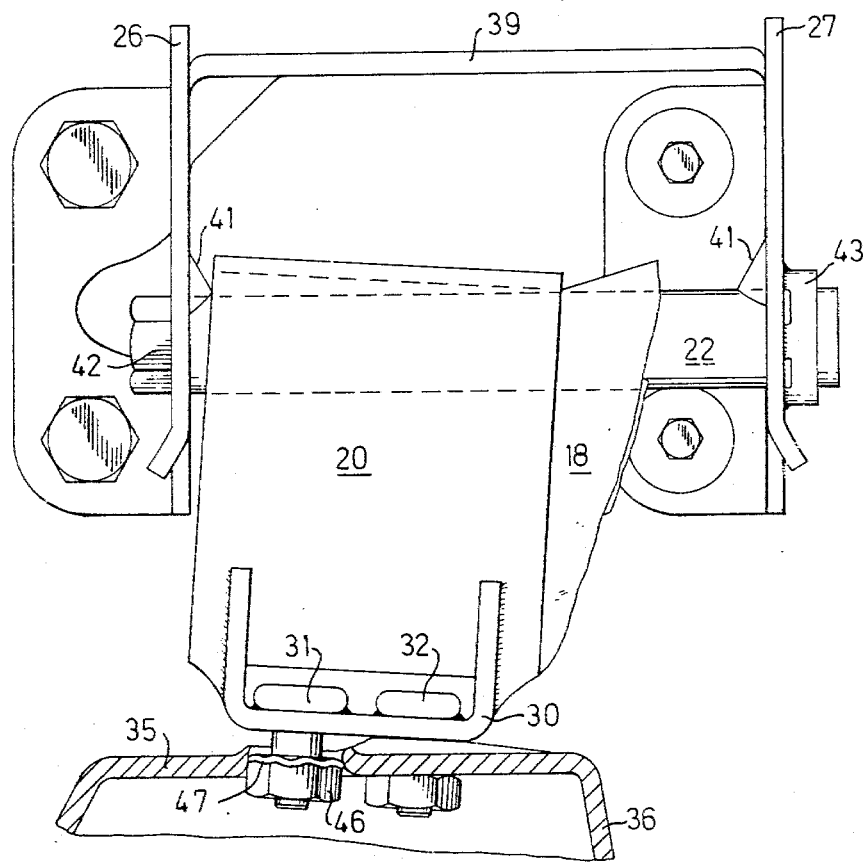

An embodiment exemplifying the invention will now be described in detail while referring to the accompanying figures of which FIG. 1 is a side view of the arrangement according to the invention for the installation of a power unit in a motor vehicle, FIG. 2 is a section taken according to II—II in FIG. 1, FIG. 3 is a plan view of an engine support formed on an inner portion of a wheel housing pertaining to the vehicle, and FIG. 4 is a side view of a resilient mounting in a position assumed during the course of a collision.

In FIG. 1, the power unit, generally denoted by the numeral 1, is formed as a unit comprising an engine 2, a primary gear 3, a gearbox 4 and a final drive 5. The power unit 1 is placed in an engine compartment 9 in the front part of a passenger car immediately in front of a so-called cowl panel 7, separating the passenger compartment 8 from the engine compartment 9. The cowl panel 7 is upwardly attached to a windshield beam 10, supporting the car windshield 11.

The power unit 1 is supported by three resilient mountings 12,13 against supports in the body 15. One mounting 12 carries the front portion of the power unit, while the other two mountings 13, of which only one is shown in FIG. 1, carry the rear portion of the power unit. The rear mountings 13 are mirror symmetrical and are arranged on either side of the engine 2, immediately above the drive shaft terminal 16 of the final drive.

The mountings 12,13 have principally the same construction. A resilient body 18, from rubber or similar material, is surrounded by a first, substantially cylindrical metal member or muff 20, and through the resilient body runs a second, substantially cylindrical tubelike metal member or carrier 22, which also extends through the muff 20. The carrier 22 and the muff 20 are completely or partially vulcanized to the elastic body 18. The latter is formed to advantage with axial cavities 23 and by means of at least one axially directed depression 24 in the muff wall, the body 18 has been given a certain amount of pretensioning with the object of providing it with desired sound and vibration insulating properties as well as mechanical strength.

The carrier 22 is rigidly fixed between two cheek plates 26,27 formed as mounting attachments, said cheek plates are at the forward mounting 12 screwed onto structural portions of the body 15, while they at the two rear mountings 13 are attached with a screwed joint to the power unit 1. The muff 20 in the forward mounting 12 is rigidly connected to the power unit 1, and in the rear mountings 13, the respective muff 20 is rigidly connected to structural portions of the body 15. The forward mounting 12 has the axes of the carrier 22 and the muff 20 substantially horizontal and transverse to the longitudinal direction of the car, while in the two rear mountings 13 these axes are substantially parallel to said direction. In the rear mountings 13, the muffs 20 have a welded-on, lower bearing plate 30, which is also provided with two welded-in screws 31,32, one screw 31 being attached obliquely in front of the other 32, the screws being disposed for extending through holes 33,34 made in a bearing surface 35 on a support 36, formed on an inner portion of a wheel housing 37 which is a part of the structural portions of the body 15. The forward hole 33 in the bearing surface 35 is provided with lateral recesses 38, enabling controlled deformation of the support 36 on the wheel housing 37 when the mounting 13 is subjected to large collision forces.

The cheek plates 26,27 in the rear mountings 13 are connected to each other by a stiffening web plate 39, to form a bracket extending parallel to the axis of the carrier 22. Furthermore, the cheek plates 26,27 are formed with depressions 41 projecting towards each other, said depressions being intended for abutment from above against the carrier 22 for transferring vertical loads from the respective cheek plate 26,27. The carrier 22 is axially secured to the cheek plates 26,27 by means of a bolt 42, which passes through the cheek plate 26, the carrier 22 and the cheek plate 27, and which is secured by means of a nut 43 welded onto the rear cheek plate 27. The cheek plates 26,27 are further provided with outer holes 44 for attaching ancillary components (not shown) to the power unit 1 by means of screwed joints.

It is apparent from FIGS. 1 and 4 that for the rear mountings 13, the carrier 22 is considerably longer than the muff 20. In the normal position of the power unit 1, there is a free distance a between the forward cheek plate 26 and the end portion of the muff 20. This distance is substantially the same as the free distance b between the power unit 1 and the cowl panel 7.

The described arrangement is intended to function in the following way during a head-on collision. After compression and deformation of the front part of the vehicle, the collision forces are transferred to the power unit 1 which is thus displaced backwards. At the rear mountings 13, the carrier 22 is also thrust backwards relative to the muff 20 while simultaneously shearing apart the resilient body 18. The front cheek plate 26 is thus brought into abutment against the forward end of the muff 20 and on continued action from the collision forces, the muff 20 is given a clockwise rotation movement as illustrated in FIG. 4. This rotation occurs simultaneously as the support 36 on the wheel housing 37 is deformed, the forward hole 33 in the bearing surface 35 associated with the support 36 being deformed in coaction with a nut 46 and a washer 47 on the forward screw 31 so that the screw 31, together with said nut 46 and washer 47, are pulled through the deformed hole 33. The rotation movement also causes deformation around the rear hole 34 on the bearing plate 30, although this connection is dimensioned for remaining intact until the power unit begins to thrust into the cowl panel 7.

Both rear mountings 13 thus prevent the rear end of the power unit from being lifted level with the windshield beam 10, and the guiding effect of the mountings 13 on the movement of the power unit 1 do not cease before the power unit is in contact with the cowl panel 7, the subsequent deformation of which takes over guidance of the continued movement of the power unit. In order that such contact between power unit and cowl panel shall be established with certainty, a controlled outer deformation of the wheel housing 37 should not start before substantially the whole or at least 90% of the free distance b between the power unit and the cowl panel 7 has been travelled.

The inventive arrangement is applicable to advantage for cars with pontoon bodies, but can also be used for cars with separate chassis or the like. The arrangement can also be applied to cars where the power unit, placed in front, substantially only comprises an engine and where the transmission is placed outside the engine compartment to a large extent.

The guidance of the power unit in the arrangement according to the invention can also be provided by mountings formed differently from those exemplified above. The form of the metal elements and also that of the individual supports 36 as well as their placing for allowing controlled outer deformation can be varied in different ways within the scope of the following claims without departing from the inventive concept prevailing for the invention.

What we claim is:

1. An arrangement for suspending a power unit in a forward engine compartment of a vehicle, for controlling during a collision the rearward movement of the power unit in the engine compartment caused by excessive forces in the length-wise direction of the vehicle, comprising a forward resilient mounting and two rear resilient mountings one on either side of the power unit connecting the power unit to structural portions of the vehicle body, at least one of said rear resilient mountings, including first and second members and a resilient body separating said first and second members, said first member being attached to the power unit, said second member being attached to structural portions of the vehicle body, characterized by the combination that said rear mountings allow the first member a limited rearward movement, in a direction generally opposite to the normal direction of travel of the vehicle, relative to the second member while absorbing deformation work in the rear mounting, said rearward movement being limited by fixed means, and that the attachment of the rear mounting to one of the group consisting of the power unit and the structural portions of the vehicle body includes means for allowing a controlled outer deformation on the application of a force exceeding a predetermined level, so that the power unit can be given a total displacement in the engine compartment to the point of contact with a cowl panel at the rear of the engine compartment before the connection formed between the power unit and the structural portions of the vehicle body by means of the rear mounting is destroyed.

2. An arrangement as claimed in claim 1, wherein said first member comprises a first member, said limited rearward movement of the metal member, restricted by said fixed means, corresponds to a distance substantially equal to a free distance between the cowl panel and the power unit when in a normal position.

3. An arrangement as claimed in claim 2, characterized in that said first and second members comprise two tubular metal members, of which one tube, having a smaller diameter than the other, extends lengthwise through the other tube, and in that the resilient body is attached to and disposed between the outer tube and the inner tube.

4. An arrangement as claimed in claim 3, characterized in that the resilient body is formed with at least one longitudinal cavity, and in that the outer tube is formed with at least one axially extending depression providing the resilient mounting with a certain pretension.

5. An arrangement as claimed in claim 3 or claim 4, further comprising mounting means, the inner tube being attached to said mounting means, said mounting means being rigidly attached to the power unit.

6. An arrangement as claimed in claim 5, said fixed means comprising means, including a bearing plate attached to the outer tube, for fastening the outer tube to structural portions of the vehicle body.

7. An arrangement as claimed in claim 6, wherein said mounting means comprised two spaced apart mounting attachments, the distance between the mounting attachment for the inner tube allowing the outer tube axial movements relative to the inner tube while absorbing shearing forces.

8. An arrangement as claimed in claim 7, characterized in that the bearing plate is attached by means of two fittable connections to a supporting surface on a support formed on the vehicle body, and in that the forward one of said connections is formed with a least one stress concentration notch for outer deformation during extraordinary force application.

9. An arrangement as claimed in claim 8, characterized in that the support is formed on the inner portion of the vehicle wheel housing, and in that a forward hole in the bearing surface for the bearing plate is formed with lateral notches allowing deformation of the support for extraordinary force effects.

10. An arrangement for suspending a power unit in front of a cowl panel in a forward engine compartment of a vehicle, for controlling during a collision the rearward movement of the power unit in the engine compartment caused by excessive forces in the lengthwise direction of the vehicle, comprising a plurality of resilient mountings connecting the power unit to structural portions of the vehicle body, there being provided a resilient rear mounting, having a resilient body separating two members, of which a first member is attached to the power unit while a second member is attached to structural portions of the vehicle body, characterized by the combination that said rear mounting allows the first member a limited rearward movement, in a direction generally opposite to the normal direction of travel of the vehicle, relative to the second member while permanently deforming the resilient body, said rearward movement being limited by fixed means, and that the attachment of the rear mounting to one of the group consisting of the power unit and the structural portions of the vehicle body include means for allowing a controlled outer deformation of said attachment of the rear mounting on the application of a force exceeding a predetermined level, said outer deformation of the attachment of the rear mounting controlling the rearward movement of the power unit at least until the power unit has been given a total displacement in the engine compartment to the point of contact with said cowl panel at the rear of the engine compartment.

11. An arrangement for suspending a power unit connected to structural portions of the vehicle body in a forward engine compartment of a vehicle, for controlling during a collision the rearward movement of the power unit in the engine compartment caused by excessive forces in the lengthwise direction of the vehicle such that the connection between the power unit and the structural portions of the vehicle body is maintained during a total displacement of the power unit in the engine compartment to a point of contact with a cowl panel at the rear of the engine compartment caused by such excessive forces, said arrangement comprising:

a forward resilient mounting and two rear resilient mountings one on either side of the power unit connecting the power unit to structural portions of the vehicle body, at least one of said rear resilient mountings including first and second members and a resilient body separating said first and second members, said first member being attached to the power unit, said second member being attached to structural portions of the vehicle body;

said first member being moveable with said power unit during the collision relative to said second member over a limited distance, in a direction of travel generally opposite to the normal direction of travel of the vehicle, said resilient body absorbs deformation work during movement of said second member over said limited distance and fixed means for limiting said movement to said limited distance; and said apparatus further comprising means for attaching said at least one of said rear mountings to one of the group comprising the power unit and the structural portions of the vehicle body, said attaching means including means for controlling outer deformation of said attaching means upon application of a force exceeding a predetermined level, said outer deformation of the attachment of said at least one of said rear mounting controlling the rearward movement of the power unit at least until the power unit has been given a total displacement in the engine compartment to the point of contact with said cowl panel at the rear of the engine compartment.

12. An arrangement for suspending a power unit in front of a cowl panel in a forward engine compartment of a vehicle, for controlling during a collision the rearward movement of the power unit in the engine compartment caused by excessive forces in the lengthwise direction of the vehicle, comprising:

a plurality of resilient mountings connecting the power unit to structural portions of the vehicle body there being provided a resilient rear mounting, including first and second members and a resilient body separating said first and second members, said first member being attached to the power unit, said second member being attached to structural portions of the vehicle body, said first member being moveable with said power unit during the collision relative to said second member over a limited distance, in a direction of travel generally opposite to the normal direction of travel of the vehicle, such that said rear resilient mounting is permanently deformed during movement of said second member over said limited distance;

fixed means for limiting said movement to said limited distance; and means for attaching said rear mounting to one of the group comprising the power unit and the structural portions of the vehicle body, said attaching means including means for controlling outer deformation of said attaching means upon application of a force exceeding a predetermined level;

said outer deformation of the attachment of the rear mounting controlling the rearward movement of the power unit at least until the power unit has been given a total displacement in the engine compartment to the point of contact with said cowl panel at the rear of the engine compartment.

* * * * *